United States Patent [19]

Bjornson

[11] Patent Number: 5,080,415
[45] Date of Patent: Jan. 14, 1992

[54] ROBOT GRIPPER HAVING AUXILIARY DEGREE OF FREEDOM

[75] Inventor: Torleif O. Bjornson, Santa Clara, Calif.

[73] Assignee: Beckman Instruments, Inc., Fullerton, Calif.

[21] Appl. No.: 566,805

[22] Filed: Aug. 10, 1990

Related U.S. Application Data

[63] Continuation of Ser. No. 185,066, Apr. 22, 1988, abandoned.

[51] Int. Cl.$^5$ .............................. B25J 15/02; B66C 1/42
[52] U.S. Cl. .................................. 294/119.1; 901/31; 901/36
[58] Field of Search ............................ 294/119.1, 86.4; 901/30–32, 36–39; 414/736, 732, 741, 621

[56] References Cited

U.S. PATENT DOCUMENTS

| | | | |
|---|---|---|---|
| 3,888,362 | 6/1975 | Fletcher et al. | 901/32 X |
| 3,935,950 | 2/1976 | Burch. | |
| 4,367,998 | 1/1983 | Causer | 901/38 X |
| 4,566,845 | 1/1986 | Mouhamed et al. | 414/735 |
| 4,616,971 | 10/1986 | Matrone | 414/741 |
| 4,627,654 | 12/1986 | Van Oost | 294/106 |
| 4,632,631 | 12/1986 | Dunlap | 294/119.1 |
| 4,637,775 | 1/1987 | Kato | 294/86.4 X |
| 4,655,662 | 4/1987 | Yoshieda et al. | 414/736 X |
| 4,655,676 | 4/1987 | Jannborg et al. | 901/31 X |
| 4,697,838 | 10/1987 | Hartman. | |
| 4,707,013 | 11/1987 | Vranish et al. | |
| 4,765,668 | 8/1988 | Slocum et al. | 294/119.1 |

FOREIGN PATENT DOCUMENTS

| | | |
|---|---|---|
| 0149806 | 7/1985 | European Pat. Off. . |
| 3618391 | 12/1987 | Fed. Rep. of Germany . |
| 3627560 | 2/1988 | Fed. Rep. of Germany . |

OTHER PUBLICATIONS

Nicholls, D. J., "Centering Mechanism for Robot Disk Holder", *IBM Technical Disclosure Bulletin* (Dec. 1984), vol. 27, No. 7B.

Primary Examiner—Margaret A. Focarino
Assistant Examiner—Dean J. Kramer
Attorney, Agent, or Firm—William H. May; P. R. Harder; Wen Liu

[57] ABSTRACT

A robot gripper module having a housing pivotally mountable to an end of a robot arm. The housing encloses a first motor for pivoting the housing about a pivot joint, and a second motor operating a rack-and-pinion gear arrangement for extending and retracting fingers. Two opposed groups attached to a rack on opposite sides of a pinion gear. Turning the pinion gear causes the fingers to move toward or away from one another. The motors which may operate independently of the robot arm, may be either servo or stepper motors. The gripper module provides additional degrees of freedom from that of the robot arm, enabling it to work with many kinds of robot arms.

8 Claims, 3 Drawing Sheets

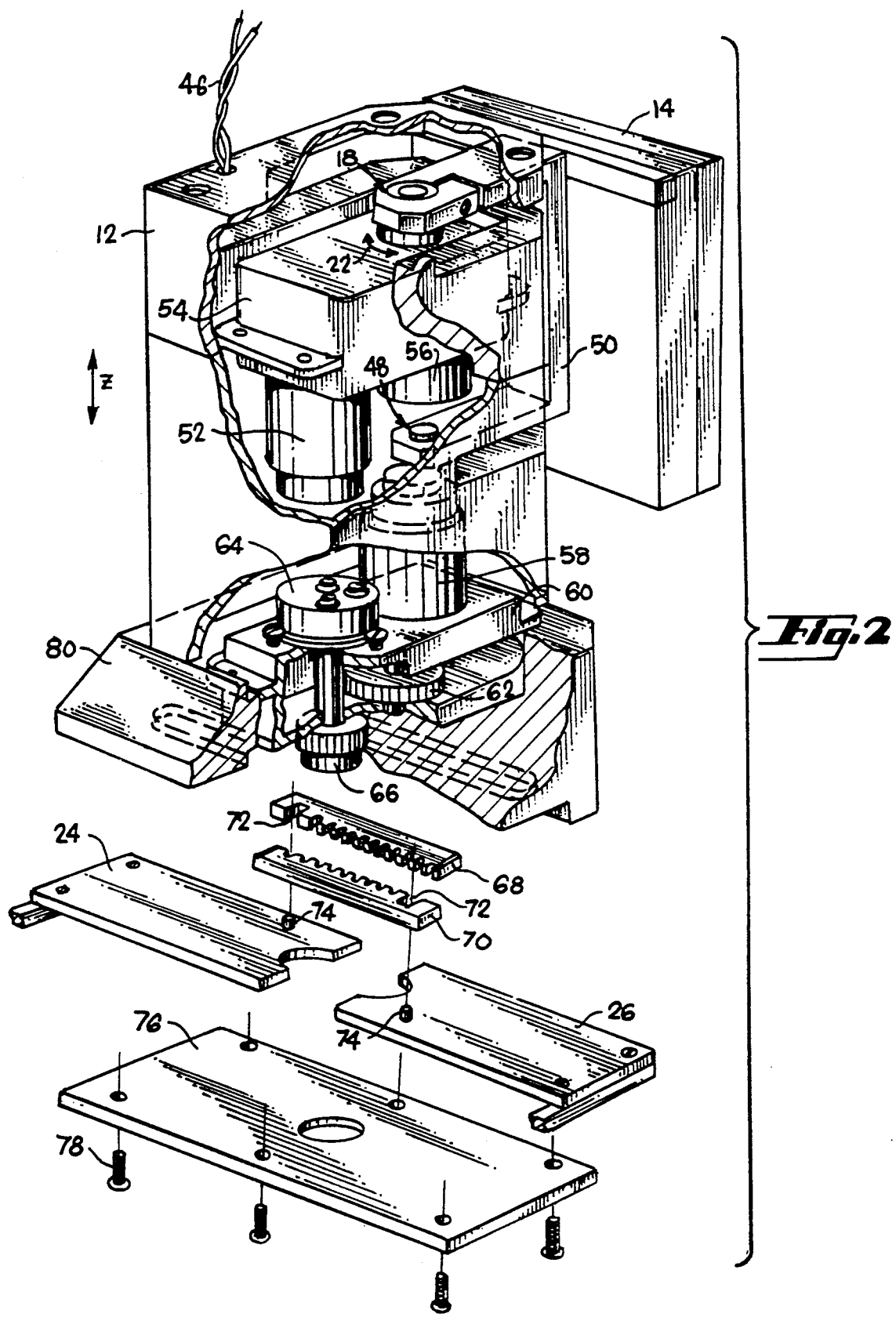

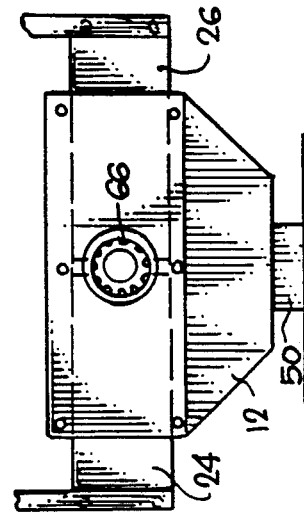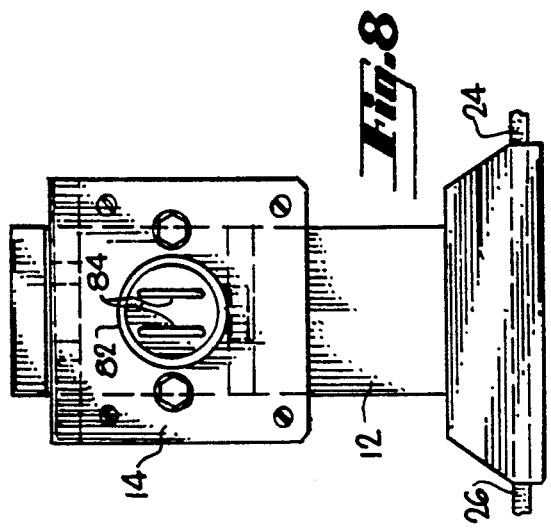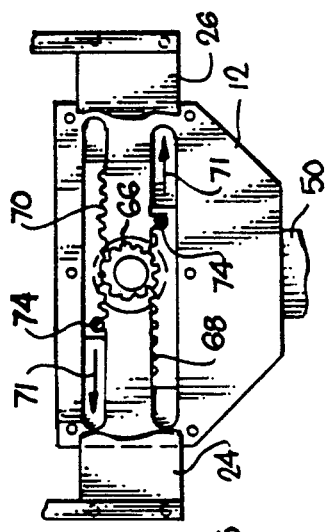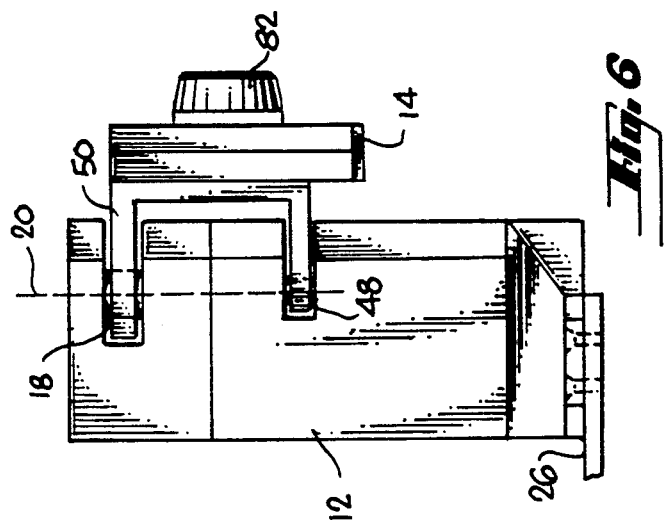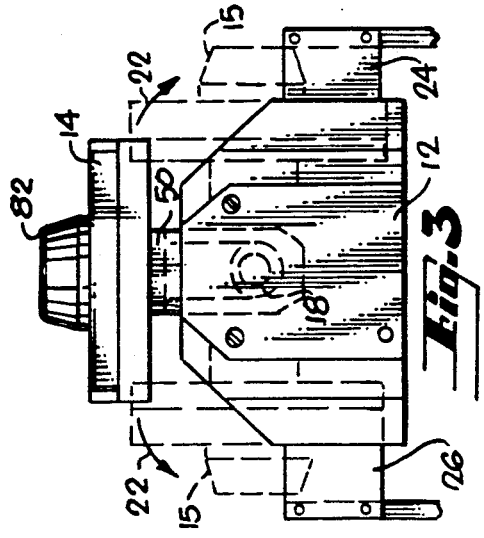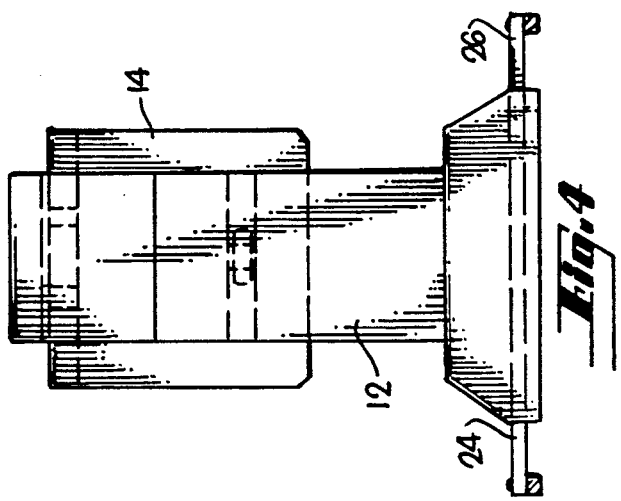

ROBOT GRIPPER HAVING AUXILIARY DEGREE OF FREEDOM

This is a continuation of application Ser. No. 07/185,066, filed Apr. 22, 1988, now abandoned.

TECHNICAL FIELD

The present invention relates to grippers attachable to robot arms for handling various kinds of work pieces.

BACKGROUND ART

In U.S. Pat. No. 4,627,654, Van Oost discloses a gripper adapted for gripping circular work pieces or work pieces having a circular bore comprising a support plate, a plurality of articulated parallelograms which are disposed in planes converging toward a common axis, each of the parallelograms including a first arm parallel to the common axis which is movable by means of an axial piston in a direction parallel to the axis and another arm provided with rollers disposed on each side of the support which is extendible or retractable in response to movement of the first arm. This latter extensible arm is also provided with fingers for clamping the workpiece when the extensible arm is either extended or retracted.

In U.S. Pat. No. 4,566,845 to Al Mouhamed et al., a gripper device is disclosed having a pair of fingers which can be displaced to grasp an article to be handled, each finger being formed by a support and a contact plate which contacts the article. The gripper module is provided with several degrees of freedom including rotational movement about a spindle axis, translation of the contact plate and rotation of the contact plate about its axis. Compressible displacement measuring pickups deliver information associated with their deformation related to the force on an object about these three degrees of motion.

The above mentioned patents are examples of useful grippers module having degrees of freedom which provide flexibility for robots. The needs of each robot must be considered individually.

A cylindrical robot is typically provided with a vertical shaft on a support base which supports a horizontal arm. Various end-effectors or hands may be attached to the end of the robot arm. The robot arm may move either up or down on the vertical shaft, may rotate about the vertical shaft or may extend or retract in order to access various locations on a table or other work space. In order to allow the hand of the robot to grasp objects in the workspace, it is necessary for the robot to be able to orient its gripping elements with respect to the object. Whereas anthropomorphic robots having joints structured like human shoulders, elbows and wrists have sufficient degrees of freedom to orient the hand in a direction suitable to grab objects, cylindrical robots are not usually provided with these degrees of freedom. Even anthropomorphic robots may need an extra degree of freedom for greater flexibility or precision.

A problem with many prior art grippers is that their utility is limited because they are driven from the robot arm. This requires that the gripper have connectors which mate with a specific robot arm for both electrical and mechanical functions. In other words, the gripper-robot interface is cumbersome.

It is an object of the present invention to provide a robot hand or gripper having supplemental degrees of freedom to those already found on robots with a simple gripper-robot interface so as to enable the gripper to grasp objects of any orientation on a work space, with fine precision, regardless of the type of robot arm to which it is attached.

DISCLOSURE OF THE INVENTION

The above object has been met with a robot gripper having a "hand" housing mountable to a working end of a robot arm, i.e. the effector end, and having one or more degrees of freedom driven from inside of the hand, supplemental to degrees of freedom found within the robot arm itself. By driving the gripper module from within itself, a robot hand itself is a robot, or a robot attached to a robot. A pivot axis in the hand is controlled by a motor disposed in the housing in fixed relation to the pivot joint so as to cause the housing to pivot through a new joint inside of the hand housing. Translation of the housing along the pivot axis, a z-axis, may be controlled by another motor within the housing.

The hand or gripper module also includes two opposed groups of fingers extending from the housing and adapted for gripping various workpieces and includes a second motor disposed within the housing, cooperating through a rack and pinion arrangement so as to extend the opposing groups of fingers apart from or toward one another. The two motors, one for pivoting and the other for gripping, are operable independently of the robot arm, and may be either servo motors or stepper motors. The groups of fingers may comprise a first group of two fingers and a second group with a single "thumb", providing a means for gripping both circular and rectangular flat objects.

An advantage of the invention is that a very simple gripper module interface may be used with a robot, since no mechanical drive need be transferred to the gripper, yet the gripper has supplemental degrees of freedom.

BRIEF DESCRIPTION OF THE DRAWINGS

FIG. 2 is a cutaway perspective of the gripper module of FIG. 1 without its fingers.

FIGS. 3-8 are respective top, front, partial bottom cutaway, left side, bottom and rear plan views of the gripper module of FIG. 1 without its fingers. FIGS. 3 and 5 illustrate possible motions of the gripper of the present invention.

BEST MODE FOR CARRYING OUT THE INVENTION

Figure 1:
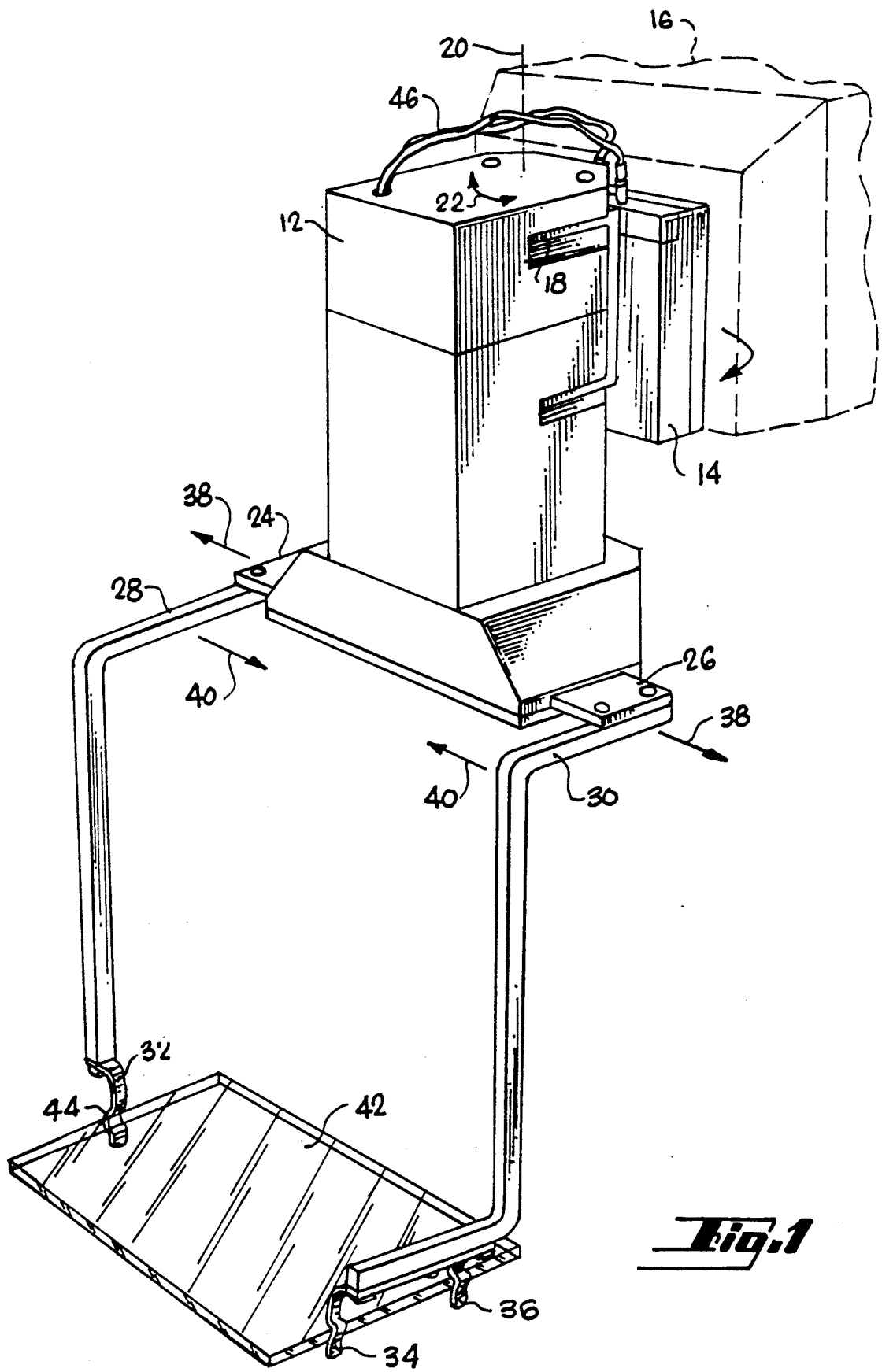
FIG. 1 is a perspective view of a robot gripper module of the present invention, attachable to a robot arm, shown in phantom, and capable of grasping a workpiece with fingers.

With reference to FIG. 1, a robot hand or gripper module of the present invention includes a housing 12 pivotally connected to a mount 14 which is mechanically attachable to a robot arm 16 by simple removable connection, an end portion of which is shown in phantom. Housing 12 is rotatable about a pivot axis 20 through joint 18, as indicated by arrows 22. This pivot rotation allows the hand of the robot to access variously oriented objects on a work space. Extending from housing 12 are a pair of bars or plates 24 and 26 from which rods 28 and extend downwardly. A first rod 28 terminates in a finger or thumb 32. Second rod 30 terminates in a pair of fingers 34 and 36. Thus, plate 24, rod 28 and thumb 32 together constitute a first group of fingers, while bar 26, rod 30 and fingers 34 and 36 together constitute a second group of fingers. The two groups of fingers are extendible or retractable from housing 12 by moving plates 24 and 26 out of or into the housing 12. Arrows 38 indicate that the two groups of fingers may be extended outwardly from the housing 12 enabling the two groups of fingers to separate from one another. Likewise arrows 40 indicate that the two groups of fingers may be retracted into housing 12 enabling the fingers to close upon one another. Each of the fingers is provided with an indentation 44 or other feature enabling it to grasp a workpiece 42 on a work space. The motion of the two groups of fingers as well as the pivoting of the housing 12 on its mount 14 are coordinated with the robot arm, but use separate control channels. Wires 46 leading into housing 12 may be attached to robot arm 16 through mount 14 or may be attached to an external source not associated with robot arm 16. Wires 46 bring in electrical power and control signals and may also transmit position information to the robot arm 16 or an external source.

Referring to FIG. 2, housing 12 is pivotally attached to mount 14 via joints 18 and 48. Mount 14 has a bracket 50 extending into housing 12 and terminating at joints 18 and 48. A motor 52, which may be either a servo or a stepper motor, operates gears in a gear cage 54 so as to cause housing 12 to pivot on its axis about joints 18 and 48. Pivoting about a vertical axis between joints 18 and 48 defines a $\theta$ axis degree of freedom. A potentiometer 56 may be used as position detector to indicate the actual amount of pivoting taking place. Motor 52 receives power and instructions via wires 46.

Also included inside housing 12 is a second motor 58 operating gears 62 in a gear cage 60. A pinion gear 66 communicating with gears 62 in gear cage 60 meshes with a pair of racks 68 and 70 disposed on opposite sides of pinion 66. Racks 68 and 70 have notches 72 which fit around pins 74 protruding from plates 24 and 26. Plates 24 and 26 are held within a base 80 of housing 12 and supported by a backplate 76 secured to base 80 by screws 78. Rotation by pinion 66 in response to action of motor 58 causes racks 68 and 70 to move in opposite directions and thereby causes plates 24 and 26 to extend outward from housing 12 or retract into housing 12 depending on the direction of pinion gear rotation. A potentiometer 64 is disposed with respect to gear cage 60 and pinion 66 so as to measure the amount of rotation of pinion gear 66 and therefore the amount of extension or retraction of plates 24 and 26. As already noted, extension or retraction of plates 24 and 26 cause a likewise extension or retraction of rods 28 and 30 and groups of fingers 32, 34 and 36.

The entire housing 12 is made to raise or lower relative to the mount 14 with the addition of another motor schematically shown as structure M in FIG. 1, as indicated by arrow Z in FIG. 2. This additional degree of freedom, Z motion parallel to the pivot axis, allows elevational corrections to be made, complementing the angular motion achieved by pivoting about an axis. This motor M would be controlled in similar fashion to the first motor described above. The Z degree of freedom is considered to be an additional degree of freedom, even if the robot already possesses a Z motion degree of freedom.

With reference to FIGS. 3-8, the robot gripper's housing 12 pivots on an axis 20 through joints 18 and 48 so as to orient itself with respect to an object to be picked up. This is indicated in FIG. 3 by arrows 22 and phantom positions 15 for mount 14. Though FIG. 3 appears to show rotation of mount 14, mount 14 is in actuality fixed to a robot arm and housing 12 rotates. In addition to pivoting, the gripper also extends and retracts fingers for picking up an object. Referring to FIGS. 5 and 7, the pinion gear 66 meshes with racks 68 and 70 so that when pinion gear 66 rotates counter-clockwise, racks 68 and 70 move in the directions indicated by arrow 71. When pinion gear 66 rotates in the opposite direction, that is clockwise, racks 68 and 70 move in the directions opposite to that indicated by arrow 71. Since plates 24 and 26 are attached to racks 68 and 70 via pins 74, rotation of pinion gear 66 causes the groups of finger attached to plates 24 and 26 to move away from each other or toward one another.

As seen in FIGS. 3, 6, 7 and 8, mount 14 may include knobs 82 or other appendages to enable it to attach to a specified robot arm. Such appendages may also have electrical interconnections 84 for transmitting electrical power or control signals to or from the robot arm and the gripper. However, in the present invention, such electrical interconnections are optional as the pivoting elements within the gripper may act independently of the robot arm with electrical connections to some external controller, or to the same controller with an independent data channel. The control of the axis of the hand must be coordinated with the motion of the primary robot, but the axis is designed as an auxiliary axis to provide additional flexibility to the robot.

The present invention provides several degrees of freedom within the robot hand or gripper module which are additional to any degrees of freedom found in a robot arm. These additional degrees of freedom allow very fine control of a hand, as opposed to the relatively coarse control available from the main robot. Because the hand is often subject to bending moments due to its position at the end of an extended arm, such fine control is desirable. Thus, the hand or gripper of the present invention can be used with many types of robot arms including cylindrical robots with only a few degrees of freedom and anthropomorphic robots with many degrees of freedom. The present invention may be considered a second robot attached to the distal end of the arm of a first robot. Further, the finger structure shown in FIG. 1 with a single finger or thumb 32 in one group of fingers and a pair of fingers 34 and 36 in a second group of fingers, enables the gripper to pick up many sizes and shapes of objects. The gripper module is especially adapted, however, for picking up rectangular flat objects, such as object 42 in FIG. 1, and circular flat objects securely.

In the present application, a robot wrist is considered as part of the arm and not the hand or gripper module. Many robots have multiple degrees of freedom associated with a robot wrist. The present invention provides degrees of freedom supplemental to those degrees of freedom of the wrist, plus others found in robot arms.

I claim:

1. A robot hand module attachable to an end of a robot arm comprising:

a housing having three motors therein, gripper means, powered by a first of said motors, mounted to the housing for performing robotic operations, said gripper means having movable, parallel, spaced apart rods, a mounting base for mounting said housing to a distal end of a robot arm, and pivot means in said housing powered by a second of said motors for coupling the mounting base and the housing for rotation of the housing by more than 45° about a radial Θ pivot, the pivot center having a perpendicular Z axis transverse to a longitudinal axis of the robot arm to which the mounting base is mounted and for translating the gripper means parallel to the Z axis with a third motor, wherein the mounting base is mounted to the end of the robot arm in a manner such that there is no mechanical coupling between the frame and the robot arm for causing rotation or translation of the frame such that the housing can rotate about the Θ axis and the gripper means can translate along the Z axis independent of control by the robot arm.

2. A robot hand module attachable to an end of a robot arm comprising:

a housing with a plurality of motors therein, gripper means mounted to the housing for performing robotic operations, said gripper means having movable, parallel, spaced-apart rods powered by a first of said motors, a mounting base for mounting said housing to a distal end of a robot arm, the mounting base comprises a mount mechanically attachable to the end of the robot arm and a bracket attached to the mount pivotally supporting the housing for rotation, and pivot means powered by a second of said motors in said housing for coupling the mounting base and the housing for rotation of the housing by more than 45° about a radial Θ axis, the pivot center having a perpendicular Z axis transverse to a longitudinal axis of the robot arm to which the mounting base is mounted, wherein the mounting base is mounted to the end of the robot arm in a manner such that there is no mechanical coupling between the frame and the robot arm for causing rotation of the housing at the pivot joint such that the housing can rotate independent of control by the robot arm.

3. A robot hand module attachable to an end of a robot arm comprising:

a housing with a plurality of motors therein for providing motion of the housing, gripper means mounted to the housing for performing robotic operations, said gripper means comprises two opposed groups of fingers adapted for handling a workpiece, a pinion gear driven by a first of said motors, two racks mechanically linked to the respective two groups of fingers, the racks meshing with the pinion gear on opposite sides thereof, whereby said opposed groups of fingers move in opposite directions in response to rotation of the pinion gear, a mounting base for mounting said housing to a distal end of a robot arm, and support means for coupling the mounting base and the frame for rotation of the frame driven by a second of said motors by more than 45° about a radial Θ axis, the pivot center having a perpendicular Z axis transverse to a longitudinal axis of the robot arm to which the mounting base is mounted, wherein the mounting base is mounted to the end of the robot arm in a manner such that there is no mechanical coupling between the housing and the robot arm for causing rotation of the housing at the pivot joint such that the housing can rotate independent of control by the robot arm.

4. A robot hand module attachable to an end of a robot arm comprising:

a housing with a plurality of motors therein for providing motion of the housing, gripper means mounted to the frame for performing robotic operation, driven by a first of said motors, said means comprises first and second opposed groups of fingers wherein the first group comprises two fingers and the second group comprises a thumb opposed to the first group, a mounting base for mounting said housing to a distal end of a robot arm, and means for coupling the mounting base and the housing for rotation of the housing, driven by a second of said motors, by more than 45° about a radial Θ pivot axis, the pivot center having a perpendicular Z axis transverse to a longitudinal axis of the robot arm to which the mounting base is mounted, wherein the mounting base is mounted to the end of the robot arm in a manner such that there is no mechanical coupling between the housing and the robot arm for causing rotation of the housing at the pivot joint such that the housing can rotate independent of control by the robot arm.

5. An independently operable robot gripper module attachable to an end of a robot arm comprising:

a housing, a mounting base for mounting the housing to a working end of a robot arm, said mounting base and said housing being pivotally connected at a pivot joint within the housing, a plurality of motors mounted in fixed positions within the housing, each of said motors being controllable separately from the robot arm for coordination with the arm, each motor being associated with an auxiliary degree of freedom of the housing which is supplemental to and distinct from any degrees of freedom associated with motion of the robot arm, one degrees of freedom of the housing being rotation about a pivot axis defined through said pivot joint, said pivot axis being transverse to a longitudinal axis of said robot arm, another of said auxiliary degrees of freedom of said housing is translation along said pivot axis, said plurality of motors including a first motor and a second motor, said first motor being disposed in fixed relation to the pivot joint for pivoting said housing relative to the mounting base by more than 45° about said pivot axis independent of control by the robot arm, means extending from said housing for gripping objects, means disposed in the housing and associated with said second motor for operating said means for gripping independent of said robot arm, and means disposed in the housing and associated with one of said plurality of motors for translating said housing parallel to said pivot axis independent of any robot arm motion.

6. An independently operable robot gripper module attachable to an end of a robot arm comprising:

a housing, a mounting base for mounting the housing to a working end of a robot arm, said mounting base and said housing being pivotally connected at a pivot joint within the housing, wherein said mounting base comprises a mount mechanically attachable to a robot arm and a bracket attached to said mount and extending into said housing, said bracket pivotally supporting said housing at said pivot joint, a plurality of motors mounted in fixed positions within the housing, each of said motors being controllable separately from the robot arm for coordination with the arm, each motor being associated with an auxiliary degree of freedom of the housing which is supplemental to and distinct from any degrees of freedom associated with motion of the robot arm, one degree of freedom of the housing being rotation about a pivot axis defined through said pivot joint, said pivot axis being transverse to a longitudinal axis of said robot arm, said plurality of motors including a first motor and a second motor, said first motor being disposed in fixed relation to the pivot joint for pivoting said housing relative to the mounting base by more than 45° about said pivot axis independent of control by the robot arm, means extending from said housing for gripping objects, and means disposed in the housing and associated with said second motor for operating said means for gripping independent of said robot arm.

7. An independently operable robot gripper module attachable to an end of a robot arm comprising:

a housing, a mounting base for mounting the housing to a working end of a robot arm, said mounting base and said housing being pivotally connected at a pivot joint within the housing, a plurality of motors mounted in fixed positions within the housing, each of said motors being controllable separately from the robot arm for coordination with the arm, each motor being associated with an auxiliary degree of freedom of the housing which is supplemental to and distinct from any degrees of freedom associated with motion of the robot arm, one degree of freedom of the housing being rotation about a pivot axis defined through said pivot joint, said pivot axis being transverse to a longitudinal axis of said robot arm, said plurality of motors including a first motor and a second motor, said first motor being disposed in fixed relation to the pivot joint for pivoting said housing relative to the mounting base by more than 45° about said pivot axis independent of control by the robot arm, means extending from said housing for gripping objects, and means disposed in the housing and associated with said second motor for operating said means for gripping independent of said robot arm, wherein said means for gripping comprises two opposed groups of fingers adapted for handling a workpiece, said second motor being disposed in fixed relation to said means for operating so as to be capable of causing movement of said two opposed groups of fingers in opposite directions, wherein said means for operating comprises a pinion gear disposed in communication with said second motor so as to be rotatable thereby and two racks mechanically linked to respective opposed groups of fingers, said racks meshing with the pinion gear on opposite sides thereof, whereby said opposed groups of fingers move in opposite directions in response to rotation of the pinion gear.

8. An independently operable robot gripper module attachable to an end of a robot arm comprising:

a housing, a mounting base for mounting the housing to a working end of a robot arm, said mounting base and said housing being pivotally connected at a pivot joint within the housing, a plurality of motors mounted in fixed positions within the housing, each of said motors being controllable separately from the robot arm for coordination with the arm, each motor being associated with an auxiliary degree of freedom of the housing which is supplemental to and distinct from any degrees of freedom associated with motion of the robot arm, one degree of freedom of the housing being rotation about a pivot axis defined through said pivot joint, said pivot axis being transverse to a longitudinal axis of said robot arm, said plurality of motors including a first motor and a second motor, said first motor being disposed in fixed relation to the pivot joint for pivoting said housing relative to the mounting base by more than 45° about said pivot axis independent of control by the robot arm, means extending from said housing for gripping objects, and means disposed in the housing and associated with said second motor for operating said means for gripping independent of said robot arm, wherein said means for gripping comprises two opposed groups of fingers adapted for handling a workpiece, said second motor being disposed in fixed relation to said means for operating so as to be capable of causing movement of said two opposed groups of fingers in opposite directions, wherein said opposed groups of fingers comprises a first group of two fingers and a second group having a thumb opposed to the first group.

* * * * *